T. H. F. SCHWOCH.
AUTOMOBILE SLEIGH.
APPLICATION FILED FEB. 20, 1915.
1,157,126.
Patented Oct. 19, 1915.
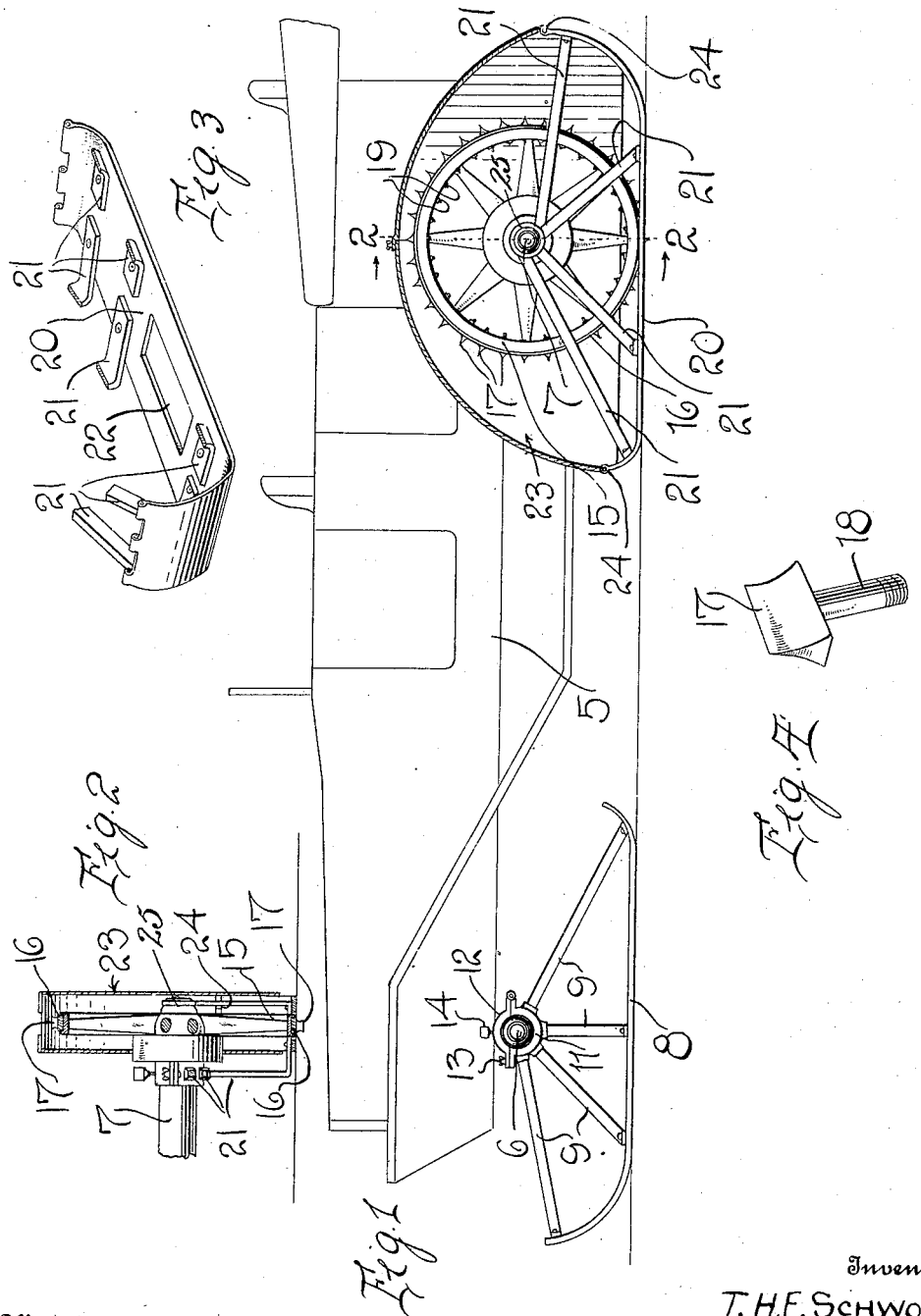
Inventor
T. H. F. Schwoch
Witnesses
By Watson E. Coleman
Attorney

UNITED STATES PATENT OFFICE.

THEODORE H. F. SCHWOCH, OF GREENWOOD, WISCONSIN.

AUTOMOBILE SLEIGH.

1,157,126.  Specification of Letters Patent.  Patented Oct. 19, 1915.

Application filed February 20, 1915. Serial No. 9,624.

*To all whom it may concern:*

Be it known that I, THEODORE H. F. SCHWOCH, a citizen of the United States, residing at Greenwood, in the county of Clark and State of Wisconsin, have invented certain new and useful Improvements in Automobile Sleighs, of which the following is a specification, reference being had to the accompanying drawings.

The invention relates to an improved automobile sleigh, and has for its primary object to provide simple and easily attachable means for converting the ordinary automobile into a power driven sleigh.

The invention has for a more particular object to provide spurred driving wheels upon the rear driven axle of a vehicle, runners detachably connected to the ends of the axle and provided with longitudinal slots to receive the respective wheels, and housing sections for the wheels rigidly mounted upon the runners.

The invention has for a further object to provide a device of the above character which is strong and durable in its construction, efficient and reliable in practical use and may be produced at small manufacturing cost.

With the above and other objects in view, my invention consists in the novel features of construction, combination, and arrangement of parts to be hereinafter more fully described, claimed, and illustrated in the accompanying drawing, in which, Figure 1 is a side elevation of an automobile sleigh embodying the present invention, a portion of the wheel housing being broken away; Fig. 2 is a section taken on the line 2—2 of Fig. 1; Fig. 3 is a perspective view of one of the rear runners; and Fig. 4 is a detail perspective view of one of the wheel spikes.

Referring in detail to the drawing, 5 designates the body of the vehicle which is mounted upon the front and rear axles, indicated at 6 and 7, respectively. To the ends of the front axle 6, the runners 8 are attached by means of a plurality of braces 9, said braces at their upper ends being connected by the bearing member 11 which receives the wheel axle. A cap or cover plate 12 is pivotally mounted at one end and extends over the axle and is secured in its closed position by the set screw 13. This cap plate carries an oil cup 14 whereby the axle and its bearing may be lubricated.

The rear wheels of the machine indicated at 15, are provided with metal tires 16, said tires and the wheel felly having openings formed therein to receive the shanks 18 of the gripping spurs 17. The body portions of these spurs are of triangular form in cross-section to provide sharp end edges which are adapted to bite into the snow or ice. The extremities of the shanks 18 are threaded to receive the nuts 19, whereby the spikes are securely held in place.

The rear runners 20 are of substantially similar form to the forward runners and are attached to the vehicle axle in the same manner by means of two sets of braces, preferably four in each set, indicated at 21. The lower ends of these braces are offset so that they may be secured to the runner at each of its longitudinal edges. The runner 20 is centrally formed with a longitudinally extending slot or opening 22 which is adapted to receive the lower portion of the wheel 15. It will be understood that the runners sustain the weight of the vehicle body at its rear end, thereby taking the weight off of the driving wheels.

To the opposite end of each of the runners 20, one section of the wheel housing 23 is hingedly attached, as at 24. These housing sections are adapted to be brought together over the wheel felly and rim and are provided with suitable means at their ends whereby the sections may be detachably connected. Each section is provided with side plates which extend upon opposite sides of the wheel, and thus inclose the same.

From the foregoing description, taken in connection with the accompanying drawing, the construction and manner of operation of my invention will be clearly and fully understood. Upon the transmission of power to the rear driving wheels of the vehicle, the spurs on the rim thereof grip the packed snow on the road surface as they successively pass downwardly through the slots 22 in the rear runners and thus drive or propel the machine. The runners 20 are curved upwardly at their rear ends in the usual manner, so as to permit of the backing or reverse movement of the machine without injury to the runners in the event that obstructions should be encountered. The runners may be very easily and quickly attached to the axles of the machine or removed therefrom, together with the spurred driving wheels, and the ordinary rubber tired vehicle wheels replaced thereon. The invention, as a whole, is comparatively simple in its construction and is strong and durable in use and may be produced at small manufacturing cost. The outer set of braces of the rear runners are connected at their upper ends to an annulus 25 which is loosely mounted on the outer end of the rear axle.

While I have shown and described the preferred construction and arrangement of the several elements employed, it will be understood that the invention is susceptible of considerable modification therein, and I, therefore, reserve the privilege of resorting to all such legitimate changes as may be fairly embodied within the spirit and scope of the invention as claimed.

Having thus fully described my invention, what I desire to claim and secure by Letters Patent is:—

The combination with a vehicle axle and a driving wheel fixed thereon, of a runner provided with a central slot to accommodate the driving wheel, an annulus mounted on the axle, a plurality of braces secured to the opposite longitudinal edges of the runner and connected to said annulus, housing sections hingedly connected at one of their ends to the opposite ends of the runner, the other ends of said sections meeting above said driving wheel, means for detachably connecting the same, and side plates secured to the housing sections for entirely inclosing the driving wheel and runner braces and afford a protecting guard for the latter.

In testimony whereof I hereunto affix my signature in the presence of two witnesses.

THEODORE H. F. SCHWOCH.

Witnesses:
 AMANDA GILBERTSON,
 E. C. GETCHEL.